(12) United States Patent
Beretta

(10) Patent No.: US 6,901,848 B2
(45) Date of Patent: Jun. 7, 2005

(54) DEVICE FOR HEATING AND WORKING UP MILK

(75) Inventor: Maurizio Beretta, Binasco MI (IT)

(73) Assignee: Cimbali S.p.A., Binasco Milan (IT)

( * ) Notice: Subject to any disclaimer, the term of this patent is extended or adjusted under 35 U.S.C. 154(b) by 0 days.

(21) Appl. No.: 10/915,815

(22) Filed: Aug. 11, 2004

(65) Prior Publication Data
US 2005/0005780 A1 Jan. 13, 2005

Related U.S. Application Data

(63) Continuation of application No. PCT/IT02/00298, filed on May 6, 2002.

(51) Int. Cl.[7] .......................... A47J 31/40; A47J 31/44; A47J 31/46; A47J 31/58; A23C 9/00
(52) U.S. Cl. .......................... 99/453; 99/293; 99/323.1; 99/452
(58) Field of Search .......................... 99/452–455, 293, 99/295, 323.1, 279, 300, 302 R, 323, 299, 495, 294; 426/433, 523; 261/DIG. 16, DIG. 76

(56) References Cited

U.S. PATENT DOCUMENTS

| | | | |
|---|---|---|---|
| 4,800,805 A | | 1/1989 | Mahlich et al. |
| 4,852,474 A | * | 8/1989 | Mahlich et al. ................ 99/293 |
| 5,476,033 A | * | 12/1995 | Locati .......................... 99/279 |
| 6,006,654 A | | 12/1999 | Pugh |

FOREIGN PATENT DOCUMENTS

| | | |
|---|---|---|
| DE | 36 32 375 A1 | 3/1988 |
| DE | 44 45 426 A1 | 6/1996 |

OTHER PUBLICATIONS

PCT Search Report for PCT/IT02/00298 (2 pages), dated Feb. 3, 2003.

* cited by examiner

Primary Examiner—Timothy F. Simone
(74) Attorney, Agent, or Firm—Kalow & Springut LLP

(57) ABSTRACT

A device for heating and working up milk, in particular for preparing cappuccinos on a coffee machine, having a conveyor pipe with an open end which can be submerged in a vessel containing milk, a first pipe for supplying steam connected to the conveyor pipe, a valve, a pressurised air source, a second pipe for supplying pressurised air connected to the conveyor pipe, a temperature transducer associated with the submergible end of the conveyor to detect the temperature of the milk, a control unit connected to the valve, to the pressurised air source, as well as to the temperature transducer, said control unit being programmable to command the open and close of said valve and to actuate said pressurised air source, one independently from the other according to the desired temperature and/or working up of the milk.

10 Claims, 1 Drawing Sheet

DEVICE FOR HEATING AND WORKING UP MILK

CROSS REFERENCE TO RELATED APPLICATION

This is a continuation application of PCT/IT02/00298 filed 06 May 2002, herein incorporated by reference.

FIELD OF INVENTION

The present invention relates to a device for heating and working up milk.

More particularly, the present invention relates to a device for heating and working up milk with control of heating temperature and of the amount of froth produced.

The invention has its main but not exclusive application in the field of the production of espresso coffee machines for bars of the type capable of making coffee, cappuccino and the like.

BACKGROUND OF THE INVENTION

The heating and working up operations of milk for making a cappuccino, i.e. a drink containing coffee and worked up milk, are generally carried out by conveying a jet of steam into a vessel, for example a jug, containing cold milk through a nozzle at the end of a steam pipe, generally equipped with a shut-off valve for controlling the flow of steam.

Devices for heating and working up milk, of the type mentioned above, are known in the state of the art in that they offer the advantage of being able to work up milk with a desired amount of froth and temperature.

Indeed, since the heating and working up is entrusted to the operator, he shuts off the supply of the flow of steam once the desired temperature is reached and after having admitted enough air to form a creamy and compact froth.

However, such operations are somewhat complex and difficult to calibrate since to obtain the desired froth at the desired temperature it is necessary to carry out actions which require a specialised ability in the field.

Consequently, the task of such operations is generally reserved to expert operators, usually with a certain skill achieved over time.

Indeed, to obtain a very hot drink with a very fine and compact froth it is necessary to work the milk with suitable movements made to the vessel, in other words a correct positioning of the steam pipe with respect to the vessel and an appropriate frequency and length of movements up and down of the vessel itself.

In particular, the operator must be capable of working up a sufficient amount of frothed milk before it exceeds the desired temperature and in any case before the bubbles start to burst due to the expansion of the gas trapped inside the milk, under the effect of the temperature.

The drawback is all the more serious if the nozzle is insufficiently submerged in the milk, since the steam discharged through the nozzle would produce dangerous jets without obtaining the formation of froth; on the other hand, a prolonged submersion of the nozzle in the milk would cause its excessive heating without entrapping air. Moreover, in the case of the evaporation temperature being exceeded, the air bubbles formed previously would expand to then burst making the froth look much less pleasant and compact.

The task is made even more difficult when espresso machines for the home are used which have a lower steam flow rate in which, therefore, the probability of obtaining a desired working up and a sufficient amount of compact froth is generally low.

According to a first solution of the prior art and disclosed in EP-A-0195750, the working up of milk is obtained through a pipe for supplying the steam in communication with a steam generator and open near to an intake chamber from which extend a supply pipe for the milk and a pipe for supplying the air from the outside, this intake chamber being put in communication with a mixing chamber from which the worked up milk comes out. The intake is carried out thanks to the Venturi effect which is possible in virtue of the special shape given to the intake zone.

This solution involves a few drawbacks and disadvantages, both from the point of view of the froth obtained, as well as from the point of view of choosing the temperature.

Indeed, the temperature is directly proportional to the steam flow rate and milk flow rate, said milk flow rate depending upon the depression generated in the intake chamber which in turn depends upon the amount of air injected to form the froth.

A second solution of the prior art foresees the use, as disclosed in DE-4445436, of a device for producing froth from milk to make a cappuccino equipped with a first pipe for supplying steam fed from a steam generator, a second pipe for supplying air in communication with a compressed air generator, a third pipe for supplying milk and a mixing zone, in which the fluids brought by the supply pipes come together before going into the frothing chamber, from which the worked up milk comes out.

Even this solution involves a few drawbacks and disadvantages.

Indeed, the demand for worked up milk with characteristics of specific froth consistency and temperature cannot be satisfied by such a device since the flow rate of sucked in milk depends upon the depression generated in the mixing chamber, and the temperature depends upon both the steam flow rate and the milk flow rate. Consequently, the limited versatility of such a device does not allow milk froth with a particular consistency required by the most demanding customers to be produced.

Moreover, with devices comprising a pipe for supplying milk, it may be so that after long periods of time unused, in the mixing zone milk stagnation forms, with harmful consequences not just for the smell of the milk to be subsequently frothed but also for hygienic reasons, since this causes the growth of undesired microorganisms. Therefore, it is necessary to periodically clean the pipe for supplying the milk, such cleaning being difficult since it requires disassembly operations and often the use of appropriate disinfectants.

According to a further solution of the prior art, thermocouples coupled with the steam nozzle allow the jet to be stopped automatically when the desired temperature level is reached.

Nevertheless, this solution also suffers the aforementioned drawbacks and in particular does not allow froth to be formed without a skilled operator capable of obtaining it manually.

Moreover, for all of the devices described above, the types of automation adopted have great restrictions in terms of the consistency and amount of froth which can be obtained from the working up of milk, as well as the temperature of the frothed milk, and in any case they do not allow the user to operate the device itself manually, if so desired.

BRIEF SUMMARY OF THE INVENTION

The present invention sets itself the problem of remedying the aforementioned drawbacks, typical of devices of the prior art, and thus of providing a device for heating and working up milk, with control of the temperature and of the amount of froth, which allows milk which is heated to the desired temperature and frothed with a predeterminable froth/liquid ratio to suit all tastes to be obtained without needing the help of a man skilled in the art.

Such a problem is solved by a device for heating and working up milk, in particular for preparing cappuccinos on coffee machines, in accordance with various embodiments of the present invention.

Various embodiments outline particularly advantageous embodiments of the device according to the invention.

BRIEF DESCRIPTION OF THE SEVERAL VIEWS OF THE DRAWINGS

Other characteristics and advantages of the invention shall become clear from reading the following description, provided for exemplifying and not limiting purposes, with the help of the figures illustrated in the attached tables, which show a device for heating and working up milk according to the present invention, in which.

DETAILED DESCRIPTION OF THE INVENTION

Figure 1:
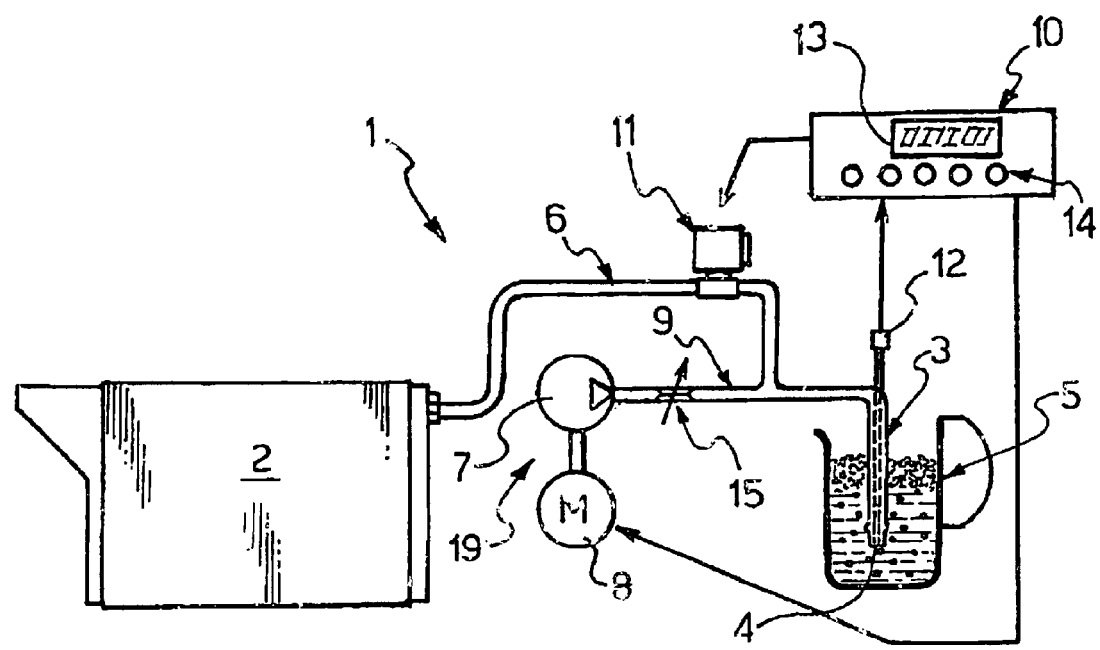
FIG. 1 shows a schematic view of a device for heating and working up milk and according to the invention.
Figure 2:
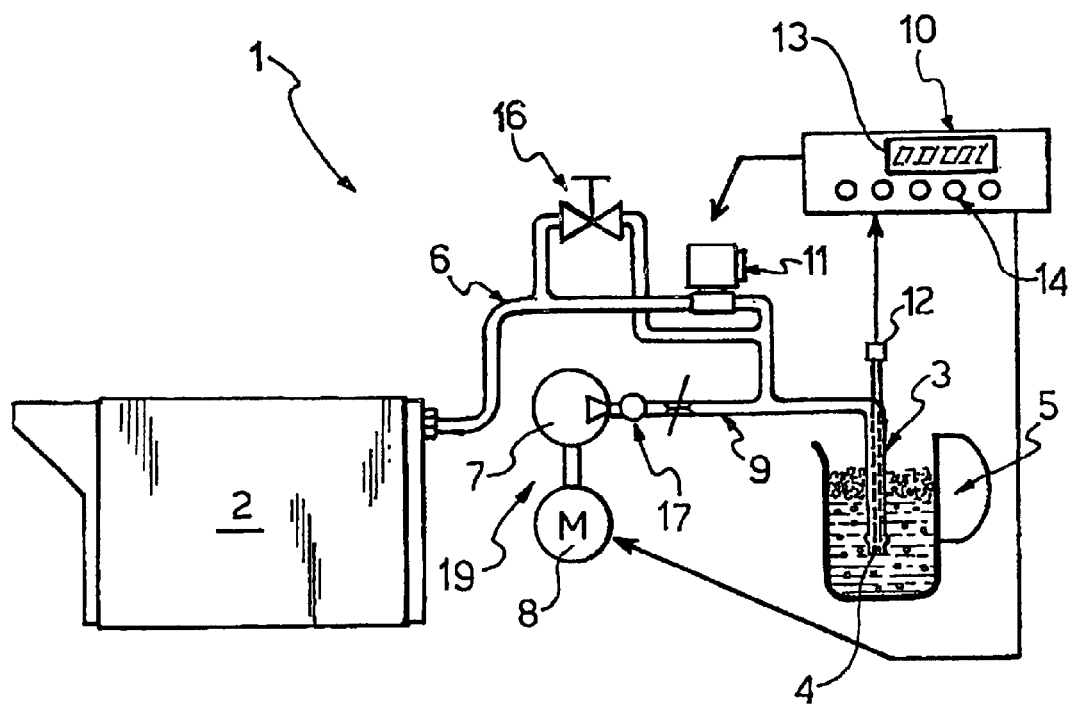
FIG. 2 shows a schematic view of the device according to the invention in accordance with a different embodiment.

With reference to the aforementioned figures, a device for heating and working up milk according to the present invention is generically indicated as 1 in FIGS 1 and 2.

For the sole purpose of simplifying the description of the present invention, in the rest of the description reference shall be made in a non-limiting manner to milk, with this also understood to refer to any drink which can be heated or which can form froth.

In the embodiment illustrated in the figures, the device 1 for heating and working up milk comprises a steam generating boiler 2 and a conveyor pipe 3 equipped with an open end 4 which can be submerged in a vessel 5 containing milk.

The steam-generating boiler 2 can of course be the one present on a machine for preparing coffee intended for the heating needed for the drink.

Moreover, the device 1 includes a first pipe 6 for supplying steam, a shut-off valve 11 arranged on the first pipe 6, a pressurised air source 19 and a second pipe 9 for supplying pressurised air.

The pressurised air source 19 preferably but not exclusively comprises, as illustrated in FIGS. 1 and 2, according to one of the embodiments of the state of the art, a pump 7 actuated by an electric motor 8. Said pressurised air source enables to produce and supply pressurised air.

The conveyor pipe 3 conveys a jet of steam and of pressurised air through the open end 4, coming from the first pipe 6 and from the second pipe 9, respectively, and going into the vessel 5. Said conveyor 3 is preferably a pipe which can be directed any way, possibly a flexible pipe, so as to ease the introduction thereof into the vessel 5, for example a jug, and to allow the complete submersion of the open end 4 in the milk to be heated and worked up.

Moreover, it should be remembered that the distance between the open end 4 of the conveyor 3 and the base of the vessel 5 can be suitably defined by a base plate, not illustrated, upon which the vessel with the milk to be frothed is placed. In such a way it is possible to obtain the heating and working up of even small amounts of milk avoiding the escape of steam sprays, which can be produced if the open end 4 of the conveyor 3 is not fully submerged in the milk.

In the case illustrated, the end 4 has a single opening. However, many holes of a suitable size and shape can be foreseen, radially or axially on the conveyor pipe 3, from where pressurised air and steam are ejected.

The steam and the pressurised air are respectively generated by the boiler 2 and by the pressurised air source, or rather by the pump 7 which is actuated by the motor 8.

The pump 7, the boiler 2 and the motor 8 shall not be described in detail hereafter since they are well known to the persons skilled in the art.

In the illustrated embodiment the first steam pipe 6 and the second pressurised air pipe 9 are connected to the conveyor pipe 3 which in such a way receives the air/steam mixture and conveys it towards the outlet end 4 which can be submerged in the milk to be worked up. The joint between the first pipe 6 and the second pipe 9 is carried out through known techniques, such as welding, threading, bayonet joint, coupling, etc.

The heating and working up of milk are managed by a control unit 10 connected to the steam shut-off valve 11, to the motor 8 of the air pump 7 and moreover to a temperature transducer 12 connected to the submergible end 4 of the conveyor 3, suitable for detecting the temperature of the milk when said end 4 is submerged in the milk.

The temperature transducer 12 is advantageously a temperature sensor such as a thermocouple, a thermoresistance and the like, the output of which, input to the control unit 10, is preferably but not exclusively of an electrical nature.

The control unit 10, in a simplified embodiment thereof, comprises a programmable CPU, not shown, a display 13 and a series of buttons 14, connected to the CPU. Said unit 10 is supplied by an electrical power source which is not shown in the figures.

Other embodiments of the control unit 10 can be realised with small modifications which are all therefore to be considered equivalents.

The CPU associates a series of operations to be carried out with each button 14. The operations to be carried out depend upon the desired temperature and/or working up of the milk.

Indeed, the control unit 10, according to the button pressed, immediately detects the temperature of the milk by the transducer 12 to act both on the steam shut-off valve 11, advantageously an electrovalve, and on the pressurised air source 19, in the first case controlling the open and shut of the valve 11, in the second case actuating the pressurised air source 19, one independently from the other, according to the temperature of the milk. Alternatively, it is moreover possible to control the opening of the valve 11 and/or to actuate the pressurised air source 19 for a predetermined period of time.

In such a way multiple combinations of desired temperature and of amount of froth in the milk can be obtained without the operator having to intervene who only has to position the conveyor pipe 3, which is equipped with the transducer 12, in the vessel 5 and wait for the end of the pressurised air/steam supply cycle.

For example, if one should wish to obtain very frothy milk at a temperature of 70° C., the control unit 10 shall stop the motor 8, and then the flow of pressurised air, at the same moment in which it will stop the flow of steam, that is when the temperature transducer 12 detects that the desired temperature is reached.

If, on the other hand, one should wish to obtain a moderately frothed milk at a temperature of 80° C., then the control unit 10 shall stop the motor 8, and then the flow of pressurised air, before the milk reaches the temperature of 80° C., while it will leave the valve 11 open in such a way allowing just steam to be supplied until the desired temperature is reached. Moreover, should one only wish to obtain hot milk without froth it is sufficient to supply just steam without making the air pump 7 intervene at all.

As can easily be understood, said examples are only some of the possible ways of operating the device 1 according to the invention and other possible alternative ways can also easily be obtained with said device 1.

Advantageously, the second pressurised air pipe 9 is equipped with a calibration member for the air flow rate, for example a throttling 15, arranged on the delivery side of the pump 7 to avoid possible oscillations in flow rate caused by the sudden starting and stopping of the motor 8 of the pump 7. Said throttling 15 can be set manually, but it is also possible for it to be slaved to the control unit 10.

Since the air pump 7 operates at a delivery pressure which is greater than the pressure generated by the steam boiler 2, so as to inject the pressurised air into the steam, i.e. in the presence of the bottleneck 15, which, obviously, causes a loss of water head, the delivery pressure of the air pump 7 shall be suitably increased to again allow the injection of the pressurised air into the steam.

According to a different embodiment, the steam pipe 6 is equipped, as illustrated in FIG. 2, with a by-pass pipe of the shut-off valve 11 slaved to the control unit 10, said by-pass comprising a manual control valve 16 for the flow of steam.

With such an embodiment of FIG. 2, in the case of necessity when a power supply is lacking for the control unit 10, and thus with the shut-off valve 11 closed, it is possible to carry out the heating and working up of milk manually, conveying the jet of steam into the vessel 5 containing milk, after having inserted the conveyor 3 into the vessel 5, manually opening the steam flow valve 16. This manual operation is totally similar to the traditional one.

The possibility of choosing to operate manually any time a skilled attendant feels the need or following a specific request from the customer is not to be excluded. This can be carried out by simply bypassing the shut-off valve 11. Moreover, such a manual operation can be effectively supported by an indication, on the display 13 of the control unit 10, of the temperature reached by the milk.

In case a possible jet of steam, during manual operation, reaches the air pump 7, in order to avoid any possible damage which could derive from it, the air pipe 9 can be equipped with a non-return valve 17.

In practice, it has been noted how the device for heating and working up milk, according to the present invention, fully solves the problem which it was set, with significant advantages with respect to the prior art.

Indeed, as previously stated, the device for heating and working up milk according to the present invention allows a cappuccino to be obtained using coffee machines with a similar quality to that which can be obtained with the traditional method, without the help of a skilled operator and with a very wide range of possible choices regarding the desired temperature and/or working up which can satisfy any requirement of a customer.

Moreover, the described device, whilst it operates to work up and heat the milk, frees the operator from the activities of manual manipulation and of checking the temperature reached by the milk, required by conventional devices, allowing him to perform other services.

It is, moreover, of note that there is the possibility of installing the described device on coffee machines for bars which already exist by making the necessary application modifications.

The invention was previously described with reference to two preferred embodiments thereof.

Nevertheless, the invention is not limited to just the embodiments described previously, but indeed comprises numerous embodiments all within the spirit and the scope of the invention as claimed hereafter.

As an example, the shut-off valve can be arranged on the conveyor pipe so as to act upon the air/steam mixture and not just on the steam as previously described.

What I claim is:

1. A device for heating and working up milk for preparing cappuccinos on a coffee machine, comprising:

a steam generating boiler;

conveyor means equipped with an open submergible end, wherein said submergible end can be submerged in a vessel containing milk;

a first pipe for supplying steam, connected between said boiler and said conveyor means;

a shut-off member;

pressurized air source;

a second pipe for supplying pressurized air, connected between said pressurized air source and said conveyor means;

a temperature sensor associated with said submergible end of the conveyor means to detect the temperature of the milk in said vessel;

a control unit connected to the shut-off member, to the pressurized air source as well as to the sensor, which is sensitive to the temperature of the milk, said control unit being programmable to control the open and close of said shut-off member and to actuate said pressurized air source, one independently from the other, according to the desired temperature and/or working up for the milk.

2. A device according to claim 1, wherein said shut-off member is arranged on said first pipe.

3. A device according to claim 1, wherein said shut-off member is arranged on said conveyor mean.

4. A device according to claim 1, wherein said conveyor means consists of at least one directable pipe, equipped with at least one opening at its submergible end.

5. A device according claim 1, wherein said second pipe is equipped with a calibration member of the air flow rate.

6. A device according to claim 5, wherein said calibration member can be adjusted and is slaved to said control unit.

7. A device according to claim 1, wherein said pressurized air source comprises a pump for generating pressurized air and a motor for actuating said pump.

8. A device according to claim 7, wherein said pressurized air pump generates a delivery pressure which is greater than the pressure of the steam in said steam pipe.

9. A device according to claim 1, wherein said steam pipe is equipped with a by-pass pipe of the shut-off means, said by-pass being equipped with a manual control valve for the steam flow.

10. A device according to claim 9, wherein said pressurized air pipe is equipped with a non-return valve.

* * * * *